US00RE40519E

(19) United States
(12) Reissued Patent
Fujiki et al.

(10) Patent Number: US RE40,519 E
(45) Date of Reissued Patent: Sep. 23, 2008

(54) CONDUCTIVE FLUORO-RESIN COMPOSITIONS

(75) Inventors: Hironao Fujiki, Takasaki (JP); Hiroyasu Hara, Takasaki (JP); Kenichi Fukuda, Takasaki (JP)

(73) Assignee: Shin-Etsu Chemical Co., Ltd., Tokyo (JP)

(21) Appl. No.: 10/246,412

(22) Filed: Sep. 19, 2002

Related U.S. Patent Documents

Reissue of:
(64) Patent No.: 6,121,359
Issued: Sep. 19, 2000
Appl. No.: 09/210,373
Filed: Dec. 14, 1998

(30) Foreign Application Priority Data

Dec. 12, 1997 (JP) ..... 9-362614

(51) Int. Cl.
*C08J 5/12* (2006.01)
*C08K 3/08* (2006.01)
*C08L 27/14* (2006.01)

(52) U.S. Cl. ..... 524/440; 524/506; 524/544; 524/545

(58) Field of Classification Search ..... 524/539, 524/440, 506, 544, 545
See application file for complete search history.

(56) References Cited

U.S. PATENT DOCUMENTS 3,948,811 A * 4/1976 Clary et al. ..... 252/514
4,178,196 A * 12/1979 Nonaka ..... 438/94
4,242,373 A * 12/1980 Watanabe et al. ..... 427/74
4,518,524 A * 5/1985 Stoetzer ..... 252/514
5,183,594 A * 2/1993 Yoshinaka et al. ..... 252/519.33
5,352,337 A * 10/1994 Kobayashi et al. ..... 205/617
5,352,517 A * 10/1994 Clough et al. ..... 428/357
5,450,065 A * 9/1995 Greenfield ..... 340/584
5,476,612 A * 12/1995 Wessling et al. ..... 252/511
5,478,616 A * 12/1995 Kochem et al. ..... 428/35.2
5,478,618 A * 12/1995 Rosen ..... 428/35.4
5,478,676 A * 12/1995 Turi et al. ..... 429/234
5,656,711 A * 8/1997 Fukuda et al. ..... 528/15
5,837,774 A * 11/1998 Tarumi et al. ..... 525/104

FOREIGN PATENT DOCUMENTS

EP 0079589 * 5/1983
JP 133432 * 5/1995
JP 8-269317 * 10/1996
JP 9-95615 * 4/1997
JP 9-316264 * 12/1997
JP 9-316276 * 12/1997

OTHER PUBLICATIONS

English Abstract for Japan 133432 Dec. 13, 1996.*
English Abstract for Japan 8–269317 Apr. 7, 1998.*
English Abstract for Japan 316276 Dec. 9, 1997.*
English Abstract for Japan 316264 Dec. 9, 1997.*

* cited by examiner

*Primary Examiner*—Nathan M. Nutter
(74) *Attorney, Agent, or Firm*—Millen, White, Zelano, Branigan, P.C.

(57) ABSTRACT

A conductive fluoro-resin composition of the addition reaction curing type is provided comprising (A) a reactive fluorinated polyether compound comprising fluorinated polyether units and having at least two aliphatic unsaturated hydrocarbon radicals in a molecule, (B) a compound having at least two hydrogen atoms each directly attached to a silicon atom, (C) a platinum group metal catalyst, and (D) silver particles. The composition cures into rubbery parts having improved heat resistance, weather resistance and solvent resistance and optionally forming firm bonds to various substrates.

30 Claims, No Drawings

CONDUCTIVE FLUORO-RESIN COMPOSITIONS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to conductive polyether based fluoro-resin compositions which cure into parts having high conductivity, improved heat resistance, weather resistance and solvent resistance and optionally forming firm bonds to various substrates. The compositions are effective in die bonding of semiconductor devices and mounting of quartz crystal oscillators.

2. Prior Art

Conductive compositions loaded with silver particles find major applications in die bonding of semiconductor devices and mounting of quartz crystal oscillators. The prior art conductive compositions used in this field are epoxy resin compositions loaded with silver particles.

With the recent advance in precision of devices and parts, however, conductive epoxy resin-based compositions tend to impose substantial stresses to parts and devices on account of the rigidity of the epoxy resins and thus have a considerable influence on the assembly properties. Softer rubbery conductive materials are thus desirable. Conductive adhesives of the silicone class are proposed, for example, in JP-A 133432/1995 corresponding to EP 653,463.

The conductive siloxane composition of this patent experiences a substantial change of conductivity by heat shocks. The influence of low molecular weight compounds on the surrounding electric parts is of concern, which is another drawback of the siloxane composition. There is a desire to have conductive materials of higher quality.

SUMMARY OF THE INVENTION

We have found that when a fluorinated polyether composition of the type curing through hydrosilylation reaction comprising (A) a reactive fluorinated polyether compound comprising fluorinated polyether units and having at least two aliphatic unsaturated hydrocarbon radicals in a molecule, (B) a compound having at least two hydrogen atoms each directly attached to a silicon atom, and (C) a platinum group metal catalyst is further blended with (D) silver particles, there is obtained a conductive fluoro-resin composition which cures into parts having improved conductivity, heat resistance, weather resistance and solvent resistance and optionally forming firm bonds to various substrates, which satisfies the requirements for the advanced precision parts, and which is effective in die bonding of semiconductor devices and mounting of quartz crystal oscillators.

Component (D) used is preferably silver particles containing at least 10% by weight of dendrite (treelike) or flake shaped silver particles based on the loading of the silver particles. More preferred are silver particles, especially flake shaped silver particles, which have been surface treated with an organopolysiloxane or fluorinated polyether compound. By blending specific silver particles, the conductive fluoro-resin composition is further improved in that the risk of undercure is eliminated and the separation with time of silver particles is prohibited.

The invention provides a conductive fluoro-resin composition comprising (A) 100 parts by weight of a reactive fluorinated polyether compound comprising fluorinated polyether units and having at least two aliphatic unsaturated hydrocarbon radicals in a molecule, (B) a compound having at least two hydrogen atoms each directly attached to a silicon atom in a sufficient amount to give 0.4 to 10 equivalents of the silicon atom-attached hydrogen atoms relative to the aliphatic unsaturated hydrocarbon radicals in component (A), (C) a sufficient amount of a platinum group metal catalyst to promote reaction between components (A) and (B), and (D) 50 to 2,000 parts by weight of silver particles.

DETAILED DESCRIPTION OF THE INVENTION

Component (A) of the conductive fluoro-resin composition according to the invention is a reactive fluorinated polyether compound comprising fluorinated polyether units and having at least two aliphatic unsaturated hydrocarbon radicals in a molecule. It is a base polymer of the composition of the invention.

In the reactive fluorinated polyether compound (A), the fluorinated polyether units are preferably of the following structural formula (1):

$$-(Rf-O)_q- \quad (1)$$

wherein Rf is a straight or branched chain perfluoroalkylene radical having 1 to 6 carbon atoms, and q is an integer of 1 to 500.

In formula (1), Rf is a straight or branched chain perfluoroalkylene radical having 1 to 6 carbon atoms, preferably 1 to 3 carbon atoms. Illustrative examples of the —Rf—O— radical include $-CF_2O-$, $-CF_2-CF_2-O-$, $-CF_2-CF_2-CF_2-O-$, $-CF_2-CF_2-CF_2-CF_2-O-$, $-CF_2-CF_2-CF_2-CF_2-CF_2-O-$, $-CF(CF_3)-CF_2-O-$, and $-CF(CF_3)_2-O-$. There may be included such recurring units of one or more than one type. Letter q is an integer of 1 to 500, preferably 2 to 400, more preferably 10 to 200.

The aliphatic unsaturated hydrocarbon radicals are preferably alkenyl radicals having 2 to 8 carbon atoms, for example, vinyl, allyl, propenyl, isopropenyl, butenyl, hexenyl, and cyclohexenyl, preferably those radicals terminated with a $CH_2{=}CH-$ structure, with the vinyl and allyl being most preferred.

While the reactive fluorinated polyether compound should have at least two aliphatic unsaturated hydrocarbon radicals in a molecule, the aliphatic unsaturated hydrocarbon radicals may be attached to both ends of the backbone of a linear fluoropolyether compound directly or via other atoms or groups or to an intermediate of the molecule. It is preferred in view of curability and cured properties that the aliphatic unsaturated hydrocarbon radicals be directly or indirectly attached to both ends of the backbone of a linear or branched fluoropolyether compound.

Typical examples of the reactive fluorinated polyether compound are compounds of the following general formula (2).

Formula (2)

$$CH_2{=}CH-(X)_p-\underset{\underset{CF_3}{|}}{CF}-(O-CF_2-\underset{\underset{CF_3}{|}}{CF})_m-O-(CF_2)_l-O-(\underset{\underset{CF_3}{|}}{CF}-CF_2-O)_n-\underset{\underset{CF_3}{|}}{CF}-(X)_p-CH{=}CH_2$$

In formula (2), X is independently —$CH_2$—, —$CH_2O$— or —Y—NR—CO— wherein Y is —$CH_2$— or

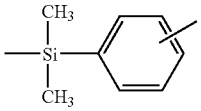

(inclusive of o, m and p-positions), R is hydrogen, methyl, aphenyl or allyl, letter p is independently equal to 0 or 1, l is an integer of 2 to 6, m and n are independently integers of 0 to 200, preferably 5 to 100.

Desirably, the reactive fluorinated polyether compounds of formula (2) have a number average molecular weight of about 400 to about 100,000, especially about 1,000 to about 50,000. Although the compounds of formula (2) are linear polymers, the recurring units —Rf—O— may be either straight or branched, and branched compounds are acceptable as component (A).

Illustrative examples of the reactive fluorinated polyether compound of formula (2) are given below.

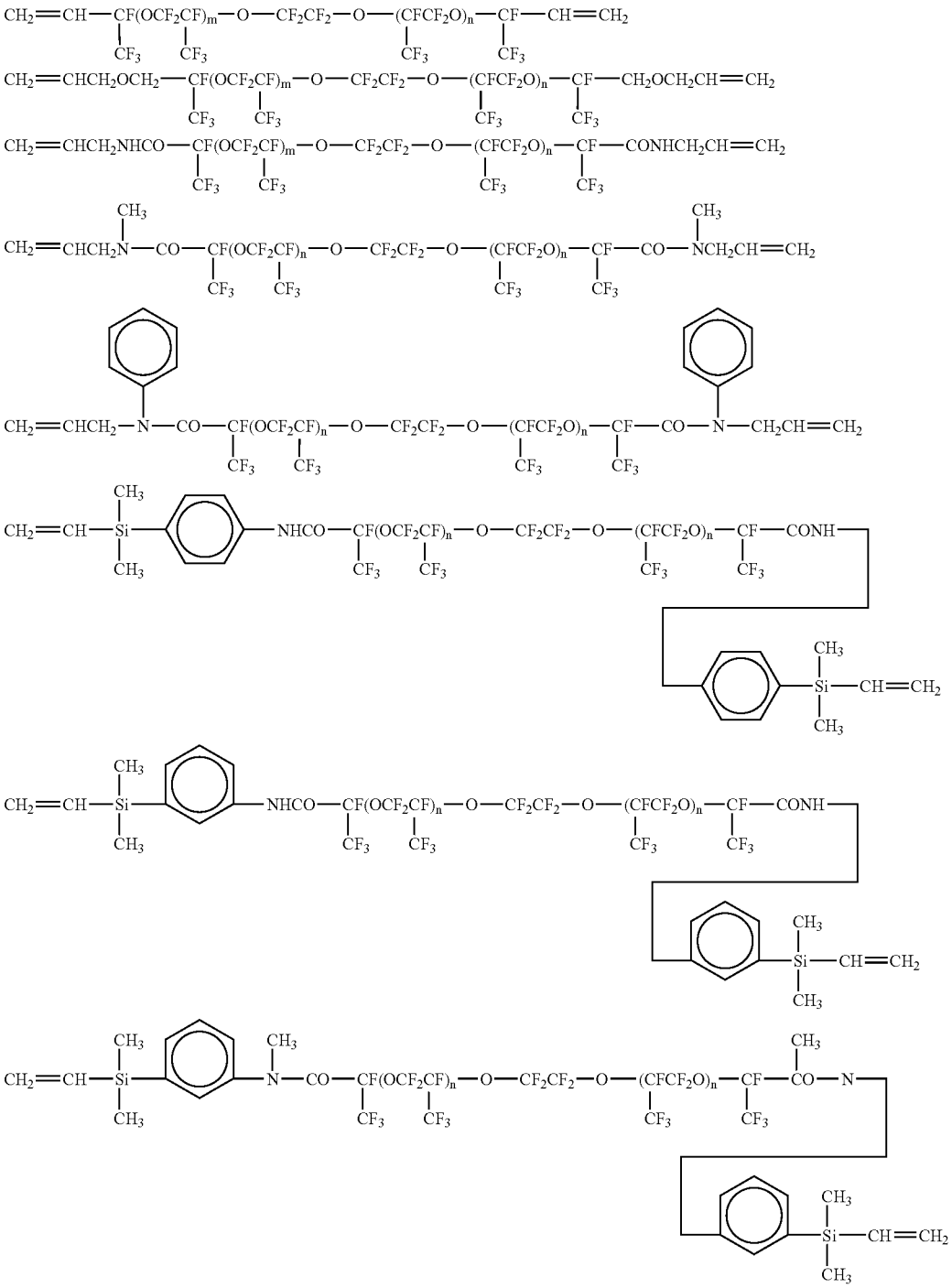

In the formulas, m and n are independently integers of 0 to 250, preferably 10 to 200.

The linear fluoropolyether compound may be adjusted to a desired molecular weight for a particular purpose. For example, addition reaction by hydrosilylation is effected between a linear fluorinated polyether compound having alkenyl radicals only at both ends of its molecular chain and an organic silicon compound such as an organopolysiloxane having two SiH radicals within its molecule (typically at both ends of its molecular chain). The resulting chain-extended product (such as a fluorinated polyether-siloxane block copolymer having fluorinated polyether moieties at both ends) may be used as component (A).

Component (B) is a compound having at least two hydrogen atoms each directly attached to a silicon atom, that is, at least two SiH radicals, preferably at least three SiH radicals. Since component (B) serves as a crosslinking agent, it may be any of compounds having SiH radicals capable of hydrosilylation reaction with aliphatic unsaturated hydrocarbon radicals in component (A) in the presence of the platinum group metal catalyst (C), for example, organohydrogenpolysiloxanes having unsubstituted or fluorine-substituted monovalent hydrocarbon radicals or perfluoropolyether-containing hydrocarbon radicals as monovalent substituents (organo radicals) on silicon atoms, hydrosilyl radical-containing perfluoro hydrocarbon compounds, and hydrosilyl radical-containing perfluoropolyether compounds. Most often, organohydrogenpolysiloxanes which are commonly employed in reaction of organopolysiloxanes are conveniently used. For the compatibility with component (A), low molecular weight organohydrogenpolysiloxanes and cyclic organohydrogenpolycyclosiloxanes having about 2 to about 10 silicon atoms, especially about 3 to about 5 silicon atoms are preferable where the monovalent substituent (or organo radical) attached to a silicon atom is an unsubstituted monovalent hydrocarbon radical free of a fluorine-substituted hydrocarbon radical.

The unsubstituted monovalent hydrocarbon radicals may be those having 1 to about 12 carbon atoms, preferably those having 1 to about 8 carbon atoms and free of an aliphatic unsaturated bond, for example, alkyl radicals such as methyl, ethyl, propyl, isopropyl, butyl, isobutyl, tert-butyl, hexyl, cyclohexyl, and octyl, alkenyl radicals such as vinyl, allyl, propenyl, and butenyl, aryl radicals such as phenyl, tolyl, xylyl, and naphthyl, and aralkyl radicals such as phenylethyl and phenylpropyl. The fluorine-substituted monovalent hydrocarbon radicals or perfluoropolyether-containing hydrocarbon radicals include perfluoroalkyl radicals having 1 to 12 carbon atoms as well as monovalent radicals of the following formulas.

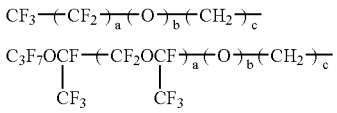

a. an integer of 0 to 9
b. 0 or 1
c. 2 or 3
d. an integer of 0 to 5

Q. 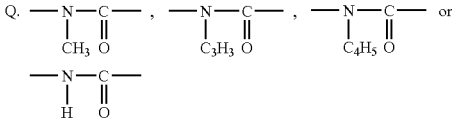

When high molecular weight siloxanes are used, they are preferably modified with fluorine compounds for improving the compatibility with component (A). Other preferred SiH sources are perfluoropolyether and perfluoropolyalkylene compounds having SiH radicals at the ends of their backbone.

Illustrative examples of the compound (B) are given below. Note that Me is methyl and Ph is phenyl.

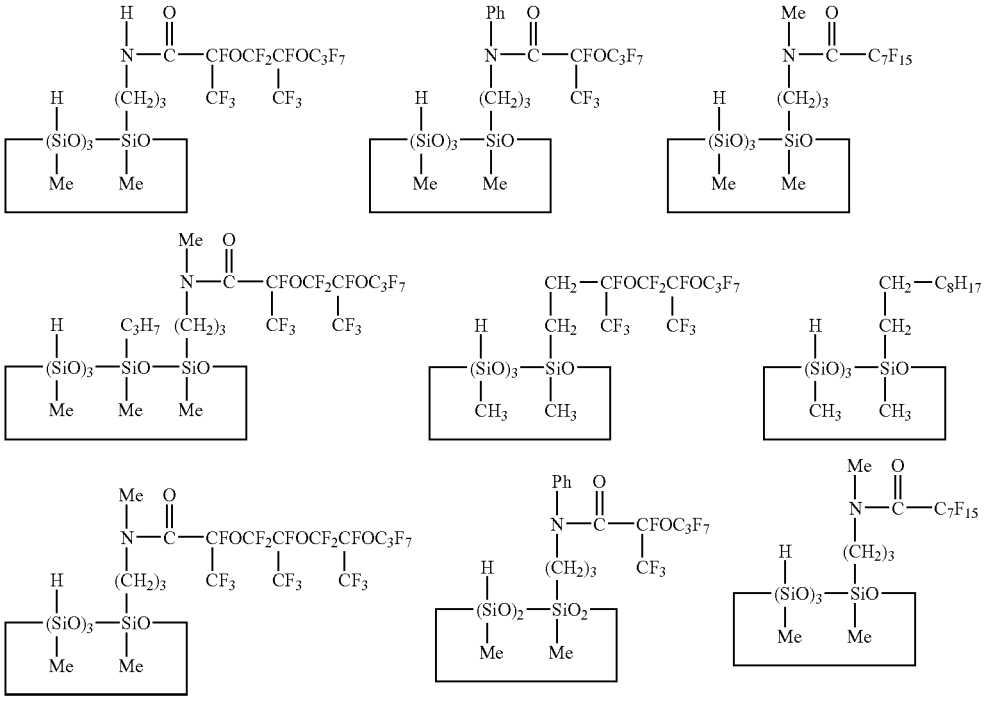

-continued

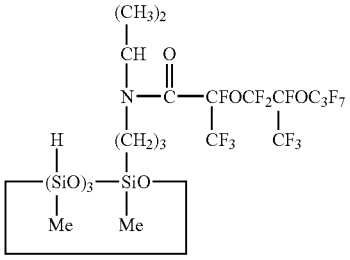

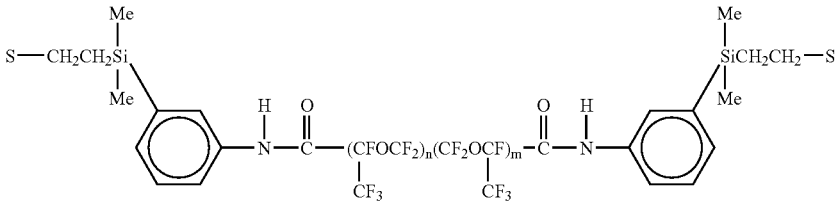

S:

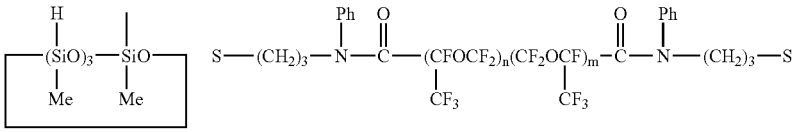

$\overline{n+m}$ = 2-50

S:

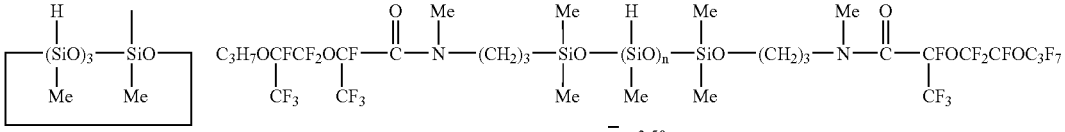

$\overline{n+m}$ = 2-50

$\overline{n}$ = 3-50

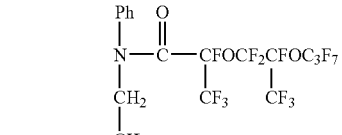

$\overline{n}$ = 3-50

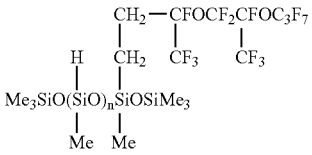

$\overline{n}$ = 3-50

The amount of component (B) blended is to give 0.4 to 10 equivalents (mol/mol) of the silicon atom-attached hydrogen atoms (that is, SiH radicals) relative to the aliphatic unsaturated hydrocarbon radicals in component (A), preferably 0.8 to 5 equivalents (mol/mol) of the SiH radicals.

Component (C) is a platinum group metal catalyst which may be selected from platinum group transition metals and compounds thereof which are conventionally employed in hydrosilylation reactions. Exemplary platinum group transition metals are platinum group metals such as Pt, Rh, and Pd. Exemplary platinum group metal compounds include chloroplatinic acid, modified complexes of chloroplatinic acid with olefins, modified complexes of chloroplatinic acid with alcohols, modified complexes of chloroplatinic acid with vinylsiloxanes, $RhCl_3$, $Rh(CH_3COCHCOCH_3)_3$, $Rh(PPh_3)_3Cl$, $Rh(PPh_3)_3Br$, $Rh_2(AcO)_4$ wherein Ac is acetyl, $Rh(PPh_3)_2(CO)Cl$, $Rh(\eta^4—C_7H_8)Cl$, $Rh(CH_3COCHCOCH_3)(CO)_2$, $Rh_4(CO)_{12}$, $Rh(CO)_{16}$, $Rh(PPh_3)_3(CO)H$, $(NH_4)_2PdCl_6$, $(NH_4)_2PdCl_4$, $Pd(CH_3COCHCOCH_3)_2$, $Pd(PhCN)_2Cl_2$, $Pd(PPh_3)_2Cl_2$, and $Pd(PPh_3)_4$.

Also useful as component (C) are platinum group metal compounds enclosed or microcapsulated in silicone resins having a melting or softening point of 40 to 150° C. (which are organosiloxane resins of three-dimensional network structure containing trifunctional siloxane units and/or $SiO_2$ units), thermoplastic resins, and organic compounds having unsaturated bonds.

The amount of the platinum group metal catalyst (C) added is a catalytic amount sufficient to promote addition reaction or hydrosilylation between components (A) and (B), thereby causing the composition to cure. Usually, the platinum group metal catalyst (C) is used in an amount to give about 1 to about 2,000 parts, especially about 5 to about 200 parts by weight of platinum group metal per million parts by weight of the composition (that is, components (A), (B), and (D) combined).

Component (D) is silver particles for imparting electric conductivity to the composition of the invention. Although the type of silver particles is not critical, reduced silver particles, electrolytic silver particles, and atomized silver particles are preferred.

The reduced silver particles are prepared by adding a reducing agent such as hydrazine, formaldehyde or ascorbic acid to an aqueous solution of silver nitrate for reducing the silver salt, obtaining particulate silver. Especially preferred are reduced silver particles having a $NH_4^+$ content of no more than about 10 ppm and a $SO_4^{2-}$ content of no more than about 5 ppm.

The electrolytic silver particles are prepared by effecting electrolysis in an aqueous solution of silver nitrate, whereby dendrite silver precipitates on the cathode. The purity and other attributes of silver particles can be adjusted by selecting electrolytic conditions. Especially preferred are electrolytic silver particles having a $NH_4^+$ content of no more than about 10 ppm and a $SO_4^{2-}$ content of no more than about 5 ppm.

The atomized silver particles are prepared by heating silver at or above 1,000° C. and atomizing the silver melt into water or inert gas. Silver is obtained in particle or irregular shape.

No particular limit is imposed on the size of silver particles although a mean particle size of 0.1 to 10 μm, especially 0.5 to 8 μm is preferred. The mean particle size is, for example, a weight average value (or median diameter) as determined by a particle size distribution meter using laser beam diffraction.

No particular limit is imposed on the shape of silver particles. Any one of granular, spherical, dendrite (or treelike), flake and irregular shapes or a mixture thereof is acceptable. Where the conductive composition of the invention is used in the absence of solvents, silver particles containing at least 10% by weight, especially 20 to 100% by weight of dendrite or flake shaped silver particles, especially flake shaped silver particles, based on the weight of the silver particles are preferably used in order that the composition exhibit high conductivity. If the proportion of dendrite or flake shaped silver particles is less than 10% by weight of the entire silver particles, the composition would become insufficiently conductive and unstable.

One preferred embodiment of the invention uses silver particles, especially flake shaped silver particles, which have been surface treated with an organopolysiloxane or fluorinated polyether compound. It is noted that the flake shaped silver particles are usually prepared by milling and rolling silver particles along with a surface treating agent (or wetter) and an optional organic solvent in a well-known milling means such as a stamp mill, ball mill, vibrating mill, hammer mill, roller mill or mortar.

In the preferred embodiment of the invention, organopolysiloxanes or fluorinated polyether compounds are used as the surface treating agent for the silver particles. Blending of such surface treated silver particles in the fluorinated polyether composition of the addition reaction curing type is effective for eliminating the risk of undercure and preventing the silver particles from separating out with the lapse of time.

In the prior art, flake silver particles are treated with suitable agents, generally known as wetters. Examples of such surface treating agents include saturated or unsaturated higher fatty acids such as lauric acid, myristic acid, palmitic acid, stearic acid, oleic acid, arachidic acid and behenic acid, metal soaps such as aluminum laurate, aluminum stearate, zinc laurate, and zinc stearate, higher aliphatic alcohols such as stearyl alcohol, esters of higher aliphatic alcohols, higher aliphatic amines such as stearyl amine, higher aliphatic amides, and polyethylene wax, alone or mixtures of two or more. We found that when silver particles are treated with the above-mentioned surface treating agent, about 0.1 to 3% by weight of the agent is left even after washing with a solvent. When silver particles with some surface treating agent left are blended in a fluorinated polyether composition of the addition reaction curing type, there can arise the problems of undercure and segregation with time of silver particles. The present invention overcome these problems by using an organopolysiloxane or fluorinated polyether compound as the surface treating agent for flake silver particles and thus offers a conductive fluoro-resin composition of higher quality.

Examples of the organopolysiloxane compounds which can be used as the surface treating agent include

- low viscosity (liquid) to gum-like diorganopoly-siloxanes such as
  - both end trimethylsiloxy-blocked dimethylpolysiloxane,
  - both end trimethylsiloxy-blocked dimethylsiloxane-methylvinylsiloxane copolymers,
  - both end trimethylsiloxy-blocked dimethylsiloxane-methylphenylsiloxane copolymers,
  - both end trimethylsiloxy-blocked dimethylsiloxane-diphenylsiloxane copolymers,
  - both end trimethylsiloxy-blocked methylhydrogenpolysiloxane,
  - both end trimethylsiloxy-blocked dimethylsiloxane-methylhydrogensiloxane copolymers,
  - both end silanol-blocked dimethylpolysiloxane,
  - both end silanol-blocked dimethylsiloxane-methylvinylsiloxane copolymers,
  - both end silanol-blocked dimethylsiloxane-methylphenylsiloxane copolymers,
  - both end silanol-blocked dimethylsiloxane-diphenylsiloxane copolymers,
  - both end silanol-blocked methylhydrogenpolysiloxane,
  - both end silanol-blocked dimethylsiloxane-methylhydrogensiloxane copolymers,
  - both end dimethylvinylsiloxy-blocked dimethylpolysiloxane,
  - both end dimethylvinylsiloxy-blocked dimethylsiloxane-methylvinylsiloxane copolymers,
  - both end dimethylvinylsiloxy-blocked dimethylsiloxane-methylphenylsiloxane copolymers,
  - both end dimethylvinylsiloxy-blocked dimethylsiloxane-diphenylsiloxane copolymers,
  - both end divinylmethylsiloxy-blocked dimethylpolysiloxane,
  - both end trivinylsiloxy-blocked dimethylpolysiloxane,
  - both end dimethylhydrogensiloxy-blocked dimethylpolysiloxane,
  - both end dimethylhydrogensiloxy-blocked methylhydrogenpolysiloxane, and
  - both end dimethylhydrogensiloxy-blocked dimethylsiloxane-methylhydrogensiloxane copolymers; and
  - silicone resins of three-dimensional network structure such as
    - silicone resins comprising $R_3SiO_{1/2}$ and $SiO_{4/2}$ units,
    - silicone resins comprising $RSiO_{3/2}$ units,
    - silicone resins comprising $R_2SiO_{2/2}$ and $RSiO_{3/2}$ units, and
    - silicone resins comprising $R_3SiO_{1/2}$, $RSiO_{3/2}$ and $SiO_{4/2}$ units,
    - wherein R represents hydrogen or unsubstituted or fluorine-substituted monovalent hydrocarbon radicals such as methyl, propyl, vinyl, phenyl, and trifluoropropyl.

Preferred of these organopolysiloxanes are hydrosilylated organopolysiloxanes each having at least one hydrogen atom directly attached to a silicon atom (i.e., SiH).

Further desirably, the organopolysiloxane used herein contains up to 500 parts, especially 0 to 100 parts by weight of non-functional low molecular weight siloxane compounds having 3 to 10 silicon atoms (oligomers of 3 to 10 monomer units), as typified by cyclic polysiloxanes (especially, cyclic dimethylsiloxane oligomers of 3 to 10 monomer units), per million parts by weight of the organopolysiloxane. If the content of low molecular weight siloxane compounds exceeds 500 ppm, the so-called silicone low molecular weight problem can arise because the conductive composition of the invention is intended for use in electric and electronic parts, for example.

The organopolysiloxane desirably has a viscosity of 50 to 100,000 centistokes (cs) at 25° C., especially 100 to 5,000 cs at 25° C.

The fluorinated polyether compounds which are used as the surface treating agent are commercially available, for example, under the trade name of Krytox from E. I. dupont, Fomblin and Garden from Auslimont, and Demnum from Daikin Industry K. K. These fluids are generally non-reactive although they can be fluorinated polyether compounds having reactive radicals such as vinyl, hydrosilyl or hydroxyl within their molecule like component (A).

The amount of the surface treating agent used is usually 0.001 to 5% by weight, preferably 0.1 to 3% by weight based on the silver particles to be treated therewith. Less than 0.001% of the surface treating agent would allow primary particles of silver to agglomerate. If more than 5% of the surface treating agent is used, compositions loaded with the treated silver particles would become less conductive and give rise to oil bleeding.

In surface treating silver particles with the surface treating agent, an organic solvent may be used as a medium or cleaning agent. Such organic solvents are not critical. Use may be made of alcoholic organic solvents such as methanol, ethanol, isopropanol, butanol, and ethyleneglycol; aliphatic organic solvents such as hexane, heptane, and octane; alicyclic organic solvents such as cyclohexane and cyclooctane; aromatic organic solvents such as toluene and xylene; ketone organic solvents such as acetone, methyl ethyl ketone, and methyl isobutyl ketone; ester organic solvents such as ethyl acetate and carbitol acetate; and fluorochemical solvents such as $C_4F_{10}$, $C_8F_{18}$, $C_4F_9OCH_3$, $C_4F_9OC_2H_5$, 2-n-nonafluorobutyl-tetrafluorofurane, tris(n-nonafluorobutyl) amine, m-xylene hexafluoride, p-xylene hexafluoride, and benzotrifluoride.

The amount of silver particles (D) added is 50 to 2,000 parts, preferably 100 to 1,800 parts by weight per 100 parts by weight of component (A). Compositions with less than 50 parts of silver particles are not fully conductive whereas more than 2,000 parts of silver particles can alleviate the binding effect of curable compositions, resulting in brittle cured products.

In addition to components (A) through (D), any of conventional well-known additives may be added to the composition of the invention insofar as the objects of the invention are not impaired. Such additives include agents for controlling hydrosilylating reaction catalysts such as acetylene alcohols, for example, 1-ethyl-1-hydroxycyclo-hexane, 3-methyl-1-butyn-3-ol, 3,5-dimethyl-1-hexyn-3-ol, 3-methyl-1-pentyn-3-ol, and phenylbutynol; 3-methyl-3-penten-1-yne and 3,5-dimethyl-3-hexen-1-yne; tackifiers (or adhesive agents) such as organosilanes or organo(poly) siloxanes containing in a molecule at least one radical selected from alkoxy, epoxy, acryloxy, methacryloxy, acid anhydride and SiH radicals (tackifiers having fluoro-modified radicals in a molecule are preferable since it is desired that the tackifiers be compatible with component (A)); pigments such as iron oxide, cerium oxide and carbon black; coloring agents, pigments, and antioxidants. These optional additives may be added in conventional amounts as long as the objects of the invention are not impaired.

Depending on a particular application, the composition of the invention may be formulated as a one-part formulation wherein essential components (A) through (D) are handled as one part, or as a two-part formulation wherein components (A), (C) and (D) form one part and components (A), (B) and (D) form another part, which parts are mixed on use.

Alternatively, the composition can be used after dissolving and diluting it in a solvent. The solvent in which component (A) is soluble is preferred. Examples include fluorochemical solvents such as $C_4F_{10}$, $C_8F_{18}$, $C_4F_9OCH_3$, $C_4F_9OC_2H_5$, 2-n-nonafluorobutyl-tetrafluorofurane, tris(n-nonafluorobutyl)amine, m-xylene hexafluoride, p-xylene hexafluoride, and benzotrifluoride.

The conductive fluoro-resin composition of the invention readily cures when it is allowed to stand at room temperature or heated. Preferably the composition is cured by heating at room temperature (e.g., 5 to 35° C.) to 200° C. for 1 minute to 24 hours. The composition cures into conductive rubber having improved properties.

There have been described conductive fluoro-resin compositions which cure into rubbery parts having high conductivity, improved heat resistance, weather resistance and solvent resistance and forming firm bonds to various substrates of glass, aluminum, polyesters, epoxy resins or the like. The compositions find effective use in die bonding of semiconductor devices and mounting of quartz crystal oscillators.

EXAMPLE

Examples of the invention are given below by way of illustration and not by way of limitation. It is noted that the viscosity is a measurement at 25° C., and Me is methyl. All parts are by weight.

Example 1

To 100 parts of a fluorinated polyether polymer of the following formula (3) (viscosity 4,400 cs, number average molecular weight 16,500, vinyl content 0.013 mol/100 g) was added 800 parts of spherical atomized silver (mean particle size 0.2 μm). Then 2.7 parts of a fluorinated hydrogenated siloxane of the following formula (4) as a crosslinking agent, 0.5 part of a 50% toluene solution of ethynyl cyclohexanol, 1.0 part of a tackifier of the following formula (5), and 10 parts of m-xylene hexafluoride were added. After the ingredients were uniformly agitated, 0.2 part of a 1,3-divinyl-1,1,3,3-tetramethydisiloxane complex of chloroplatinic acid (platinum concentration 1.0 wt %) was added to the mixture and thoroughly mixed therewith. The mixture was cast on a Teflon-coated support. After the solvent volatilized off, the coating was heat cured at 120° C. for one hour into a sheet of about 1 mm thick. The sheet was measured for volume resistivity, finding a value of $3\times10^{-5}$ Ω-cm.

Separately, the composition was applied dropwise onto supports of glass, aluminum, polyester and epoxy resin. After the solvent volatilized off, the coating was heat cured at 120° C. for one hour, establishing satisfactory bonds to all the supports.

(3)

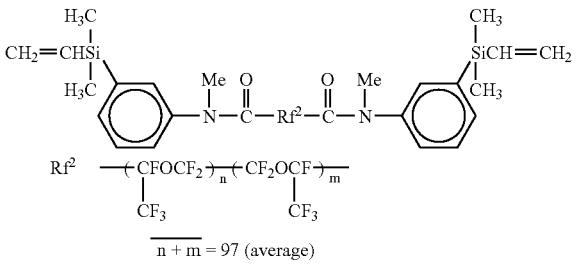

-continued (4)

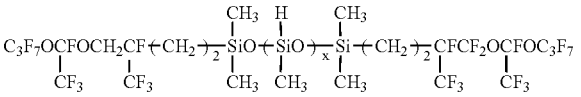

$\overline{x} = 8$ (5)

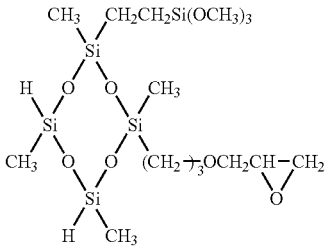

Example 2

To 100 parts of a fluorinated polyether polymer of the following formula (6) (viscosity 12,200 cs, number average molecular weight 16,000, vinyl content 0.013 mol/100 g) were added 46.3 parts of a compound of the following formula (7) as a crosslinking agent, 1.0 part of a compound of the following formula (8) as a tackifier, 800 parts of dimethylsiloxane-treated, flake-shaped silver particles prepared by the procedure described below, 0.5 part of a 50% toluene solution of ethynyl cyclohexanol, and 1.0 part of a tackifier of above formula (5). After the ingredients were uniformly agitated, 0.2 part of a 1,3-divinyl-1,1,3,3-tetramethydisiloxane complex of chloroplatinic acid (platinum concentration 1.0 wt %) was added to the mixture and thoroughly mixed therewith. The mixture was cast on a Teflon-coated support and heat cured at 120° C. for one hour into a sheet of about 1 mm thick. The sheet was measured for volume resistivity, finding a value of $1\times10^{-5}$ Ω-cm.

Separately, the composition was applied dropwise onto supports of glass, aluminum, polyester and epoxy resin. After the solvent volatilized off, the coating was heat cured at 120° C. for one hour, establishing satisfactory bonds to all the supports.

Preparation or Dimethylsiloxane Treatment of Silver Particles

Reduced silver powder particles having a mean particle size of 0.8 μm were milled, rolled and surface treated in a ball mill using as a lubricant a linear dimethylpolysiloxane blocked with trimethylsilyl at each end of its molecular chain, having a viscosity of 5,000 cs at 25° C. and containing 150 ppm in total of non-functional low molecular weight cyclic siloxanes (cyclic dimethylsiloxanes) in the form of oligomers of 3 to 10 monomer units. The treated silver powder was washed with toluene, obtaining flake-shaped silver powder having a mean particle size of 5 μm.

(6)

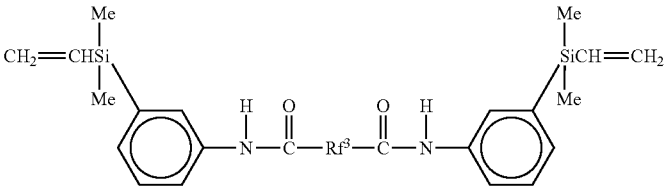

$Rf^3$:

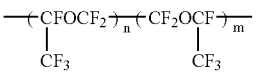

$\overline{n+m} = 94$ (average)

(7)

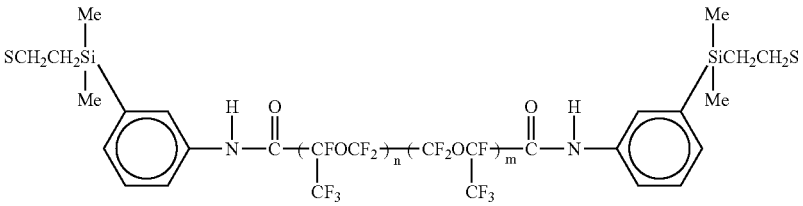

S:

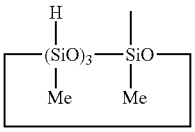

$\overline{n+m} = 32$(average)

-continued (8)

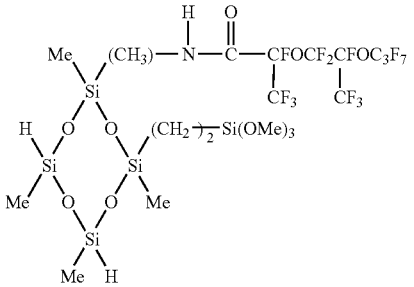

Example 3

To 100 parts of the fluorinated polyether polymer of formula (6) (viscosity 12,200 cs, number average molecular weight 16,000, vinyl content 0.013 mol/100 g) were added 46.3 parts of the compound of formula (7) as a crosslinking agent, 1.0 part of the compound of formula (8) as a tackifier, 800 parts of hydrogenated siloxane-treated, flake-shaped silver particles prepared by the procedure described below, 0.5 part of a 50% toluene solution of ethynyl cyclohexanol, and 1.0 part of the tackifier of formula (5). After the ingredients were uniformly agitated, 0.2 part of a 1,3-divinyl-1,1,3,3-tetramethydisiloxane complex of chloroplatinic acid (platinum concentration 1.0 wt %) was added to the mixture and thoroughly mixed therewith. The mixture was cast on a Teflon-coated support and heat cured at 120° C. for one hour into a sheet of about 1 mm thick. The sheet was measured for volume resistivity, finding a value of $4\times10^{-5}$ Ω-cm.

Separately, the composition was applied dropwise onto supports of glass, aluminum, polyester and epoxy resin. After the solvent volatilized off, the coating was heat cured at 120° C. for one hour, establishing satisfactory bonds to all the supports.

Preparation or Hydrogenated-siloxane Treatment of Silver Particles

In a flask, 1,200 g of a hydrogenated siloxane, 1,3,5,7-tetrahydro-1,3,5,7-tetramethylcyclotetrasiloxane and 132 g of 1,1,3,3-tetramethyldisiloxane were mixed, to which 1 g of fuming sulfuric acid was added as a catalyst. Agitation was continued at 25° C. for 24 hours. Thereafter, 5 g of sodium hydrogen carbonate was added to the mixture, which was filtered. A fraction was distilled off at 80° C. and 1 mmHg, collecting methylhydrogenpolysiloxane having a viscosity of 15 cs. Gas chromatography confirmed that this polysiloxane was free of non-functional low molecular weight siloxanes (cyclic dimethylsiloxanes).

Reduced silver powder particles having a mean particle size of 0.8 μm were milled, rolled and surface treated in a ball mill using the hydrogenated polysiloxane as a lubricant. The treated silver powder was washed with toluene, obtaining flake-shaped silver powder having a mean particle size of 5 μm.

Example 4

To 100 parts of the fluorinated polyether polymer of formula (6) (viscosity 12,200 cs, number average molecular weight 16,000, vinyl content 0.013 mol/100 g) were added 46.3 parts of the compound of formula (7) as a crosslinking agent, 1.0 part of the compound of formula (8) as a tackifier, 800 parts of fluorinated polyether-treated, flake-shaped silver particles prepared by the procedure described below, 0.5 part of a 50% toluene solution of ethynyl cyclohexanol, and 1.0 part of the tackifier of formula (5). After the ingredients were uniformly agitated, 0.2 part of a 1,3-divinyl-1,1,3,3-tetramethydisiloxane complex of chloroplatinic acid (platinum concentration 1.0 wt %) was added to the mixture and thoroughly mixed therewith. The mixture was cast on a Teflon-coated support and heat cured at 120° C. for one hour into a sheet of about 1 mm thick. The sheet was measured for volume resistivity, finding a value of $8\times10^{-4}$ Ω-cm.

Separately, the composition was applied dropwise onto supports of glass, aluminum, polyester and epoxy resin. After the solvent volatilized off, the coating was heat cured at 120° C. for one hour, establishing satisfactory bonds to all the supports.

Preparation or Fluorinated-polyether Treatment of Silver Particles

Reduced silver powder particles having a mean particle size of 0.8 μm were milled, rolled and surface treated in a ball mill using FOMBLIN-YR as a lubricant. The treated silver powder was washed with m-xylene hexafluoride, obtaining flake-shaped silver powder having a mean particle size of 5 μm. FOMBLIN-YR was a linear perfluoropolyether fluid having a number average molecular weight of 6,250 and a viscosity of 1,500 cs at 20° C. commercially available from Auslimont. Its structural formula is given below.

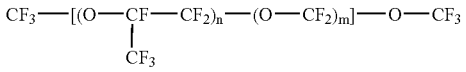

Reference Example 1

To 100 parts of the fluorinated polyether polymer of formula (6) (viscosity 12,200 cs, number average molecular weight 16,000, vinyl content 0.013 mol/100 g) were added 46.3 parts of the compound of formula (7) as a crosslinking agent, 1.0 part of the compound of formula (8) as a tackifier, 800 parts of fatty acid-treated, flake-shaped silver particles prepared by the procedure described below, 0.5 part of a 50% toluene solution of ethynyl cyclohexanol, and 1.0 part of the tackifier of formula (5). After the ingredients were uniformly agitated, 0.2 part of a 1,3-divinyl-1,1,3,3-tetramethydisiloxane complex of chloroplatinic acid (platinum concentration 1.0 wt %) was added to the mixture and thoroughly mixed therewith. The mixture was cast on a Teflon-coated support and heated at 120° C. for one hour, but the desired rubber sheet was not obtained owing to the hindered curing by the fatty acid.

Preparation or Fatty Acid Treatment of Silver Particles

Reduced silver powder particles having a mean particle size of 0.8 μm were milled, rolled and surface treated in a ball mill using lauric acid as a lubricant. The treated silver powder was washed with toluene, obtaining flake-shaped silver powder having a mean particle size of 5 μm.

Reference Example 2

To 100 parts of the fluorinated polyether polymer of formula (6) (viscosity 12,200 cs, number average molecular weight 16,000, vinyl content 0.013 mol/100 g) were added 46.3 parts of the compound of formula (7) as a crosslinking agent, 1.0 part of the compound of formula (8) as a tackifier, 800 parts of fatty acid ester-treated, flake-shaped silver particles prepared by the procedure described below, 0.5 part of a 50% toluene solution of ethynyl cyclohexanol, and 1.0 part of the tackifier of formula (5). After the ingredients were uniformly agitated, 0.2 part of a 1,3-divinyl-1,1,3,3-tetramethydisiloxane complex of chloroplatinic acid (platinum concentration 1.0 wt %) was added to the mixture and thoroughly mixed therewith. The mixture was cast on a Teflon-coated support and heated at 120° C. for one hour into a sheet of about 1 mm thick. The sheet was measured for volume resistivity, finding a value of $3\times10^{-3}$ Ω-cm.

Separately, the composition was applied dropwise onto supports of glass, aluminum, polyester and epoxy resin. After the solvent volatilized off, the coating was heat cured at 120° C. for one hour, failing to bond to all the supports.

Preparation or Fatty Acid Ester Treatment of Silver Particles

Reduced silver powder particles having a mean particle size of 0.8 μm were milled, rolled and surface treated in a ball mill using ethyl laurate as a lubricant. The treated silver powder was washed with toluene, obtaining flake-shaped silver powder having a mean particle size of 5 μm.

Japanese Patent Application No. 362614/1997 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A conductive fluoro-resin composition comprising (A) 100 parts by weight of a reactive fluorinated polyether compound comprising fluorinated polyether units and having at least two aliphatic unsaturated hydrocarbon radicals in a molecule, (B) a compound having at least two hydrogen atoms each directly attached to a silicon atom in a sufficient amount to give 0.4 to 10 equivalents of the silicon atom-attached hydrogen atoms relative to the aliphatic unsaturated hydrocarbon radicals in component (A), (C) a sufficient amount of a platinum group metal catalyst to promote reaction between components (A) and (B), and (D) 50 to 2,000 parts by weight of silver particles wherein the silver particles have a $NH_4^+$ content of no more than about 10 ppm and a $SO_2^{2-}$ content of no more than about 5 ppm.

2. The conductive fluoro-resin composition of claim 1, wherein the reactive fluorinated polyether compound (A) comprises fluorinated polyether units of the following structural formula (1):

$$—(Rf—O)_q— \quad (1)$$

wherein Rf is a straight or branched chain perfluoroalkylene radical having 1 to 6 carbon atoms, and q is an integer of 1 to 500.

3. The conductive fluoro-resin composition of claim 1, wherein the silver particles (D) contain at least 10% by weight of dendrite or flake shaped silver particles based on the loading of the silver particles.

4. The conductive fluoro-resin composition of claim 1, wherein the reactive fluorinated polyether compound is of the formula (2):

$$CH_2{=}CH—(X)_p—\underset{\underset{CF_3}{|}}{CF}—(O—CF_2—\underset{\underset{CF_3}{|}}{CF})_m—O—(CF_2)_l—O—(\underset{\underset{CF_3}{|}}{CF}—CF_2—O)_n—\underset{\underset{CF_3}{|}}{CF}—(X)_p—CH{=}CH_2 \quad (2)$$

wherein X is independently $—CH_2—$, $—CH_2O—$ or —Y—NR—CO— wherein Y is $—CH_2—$ or

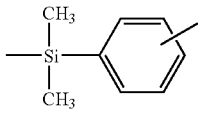

inclusive of o, m and p-positions, R is hydrogen, methyl, phenyl or allyl, letter p is independently equal to 0 or 1, l is an integer of 2 to 6, m and n are independently integers of 0 to 200.

5. The conductive fluoro-resin composition of claim 1, wherein the reactive fluorinated polyether compound has a number average molecular weight of about 400 to about 100,000.

6. The conductive fluoro-resin composition of claim 1, wherein the compound having at least two hydrogen atoms each directly attached to a silicon atom, (B), is a low molecular weight organohydrogenpolysiloxane or cyclic organohydrogenpolycyclosiloxane having 2 to 10 silicon atoms.

7. The conductive fluoro-resin composition of claim 1, wherein the compound having at least two hydrogen atoms each directly attached to a silicon atom, (B), is a perfluoropolyether or perfluoropolyalkylene compound having SiH radicals at the ends of the backbones thereof.

8. The conductive fluoro-resin composition of claim 1, wherein the silver particles are reduced silver particles, electrolytic silver particles or atomized silver particles.

9. The conductive fluoro-resin composition of claim 1, wherein the silver particles have a mean particle size of 0.1 to 10 μm.

10. A conductive fluoro-resin composition comprising (A) 100 parts by weight of a reactive fluorinated polyether compound comprising fluorinated polyether units and having at least two aliphatic unsaturated hydrocarbon radicals in a molecule, (B) a compound having at least two hydrogen atoms each directly attached to a silicon atom in a sufficient amount to give 0.4 to 10 equivalents of the silicon atom-attached hydrogen atoms relative to the aliphatic unsaturated hydrocarbon radicals in component (A), (C) a sufficient amount of a platinum group metal catalyst to promote reaction between components (A) and (B), and (D) 50 to 2,000 parts by weight of silver particles;

wherein the silver particles have been surface treated with an organopolysiloxane or fluorinated polyether compound.

11. The conductive fluoro-resin composition of claim 10, wherein said silver particles are surface treated with an organopolysiloxane which is a hydrosilylated organopolysiloxane having at least one hydrogen atom directly attached to a silicon atom.

12. The conductive fluoro-resin composition of claim 10, wherein said silver particles are surface treated with an organopolysiloxane which contains up to 500 ppm of non-functional low molecular weight organopolysiloxanes having 3 to 10 silicon atoms.

13. The conductive fluoro-resin composition of claim 10, wherein the silver particles are surface treated with a fluorinated polyether compound.

14. The conductive fluoro-resin composition of claim 10, wherein the silver particles are surface treated with 0.001 to 5% by weight of the organopolysiloxane or fluorinated polyether compound.

15. The conductive fluoro-resin composition of claim 10, wherein the reactive fluorinated polyether compound is of the formula (2):

$$CH_2{=}CH{-}(X)_p{-}\underset{\underset{CF_3}{|}}{CF}{-}(O{-}CF_2{-}\underset{\underset{CF_3}{|}}{CF})_m{-}O{-}(CF_2)_l{-}O{-}(\underset{\underset{CF_3}{|}}{CF}{-}CF_2{-}O)_n{-}\underset{\underset{CF_3}{|}}{CF}{-}(X)_p{-}CH{=}CH_2 \quad (2)$$

wherein X is independently $-CH_2-$, $-CH_2O-$ or $-Y-NR-CO-$ wherein Y is $-CH_2-$ or

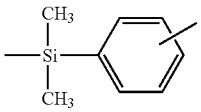

inclusive of o, m and p-positions R is hydrogen, methyl, phenyl or allyl, letter p is independently equal to 0 or 1, l is an integer of 2 to 6, m and n are independently integers of 0 to 200.

16. The conductive fluoro-resin composition of claim 10, wherein the reactive fluorinated polyether compound has a number average molecular weight of about 400 to about 100,000.

17. The conductive fluoro-resin composition of claim 10, wherein the compound having at least two hydrogen atoms each directly attached to a silicon atom, (B), is a low molecular weight organohydrogenpolysiloxane or cyclic organohydrogenpolycyclosiloxane having 2 to 10 silicon atoms.

18. The conductive fluoro-resin composition of claim 10, wherein the compound having at least two hydrogen atoms each directly attached to a silicon atom, (B), is a perfluoropolyether or perfluoropolyalkylene compound having SiH radicals at the ends of the backbones thereof.

19. The conductive fluoro-resin composition of claim 10, wherein the silver particles have a $NH_4^+$ content of no more than about 10 ppm and a $SO_2^{2-}$ content of no more than about 5 ppm.

20. The conductive fluoro-resin composition of claim 10, wherein the silver particles are reduced silver particles, electrolytic silver particles or atomized silver particles.

21. The conductive fluoro-resin composition of claim 10, wherein the silver particles have a mean particle size of 0.1 to 10 μm.

*22. A conductive fluoro-resin composition comprising*

*(A) 100 parts by weight of a reactive fluorinated polyether compound comprising fluorinated polyether units and having at least two aliphatic unsaturated hydrocarbon radicals in a molecule,*

*(B) a compound having at least two hydrogen atoms each directly attached to a silicon atom in a sufficient amount to give 0.4 to 10 equivalents of the silicon atom-attached hydrogen atoms relative to the aliphatic unsaturated hydrocarbon radicals in component (A),*

*(C) a sufficient amount of a platinum group metal catalyst to promote reaction between components (A) and (B), and*

*(D) 50 to 2,000 parts by weight of atomized silver particles, wherein the silver particles are not surface treated.*

*23. The conductive fluoro-resin composition of claim 22, wherein the reactive fluorinated polyether compound (A) comprises fluorinated polyether units of the following structural formula (1):*

$$-(Rf-O)_q- \quad (1)$$

*wherein Rf is a straight or branched chain perfluoroalkylene radical having 1 to 6 carbon atoms, and q is an integer of 1 to 500.*

*24. The conductive fluoro-resin composition of claim 22, wherein the silver particles (D) contain at least 10% by weight of dendrite or flake shaped silver particles based on the loading of the silver particles.*

*25. The conductive fluoro-resin composition of claim 22, wherein the reactive fluorinated polyether compound is of the formula (2):*

$$CH_2{=}CH{-}(X)_p{-}\underset{\underset{CF_3}{|}}{CF}{-}(O{-}CF_2{-}\underset{\underset{CF_3}{|}}{CF})_m{-}O{-}(CF_2)_l{-}O{-}(\underset{\underset{CF_3}{|}}{CF}{-}CF_2{-}O)_n{-}\underset{\underset{CF_3}{|}}{CF}{-}(X)_p{-}CH{=}CH_2 \quad (2)$$

*wherein X is independently $-CH_2-$, $-CH_2O-$ or $-Y-NR-CO-$ wherein Y is $-CH_2-$ or*

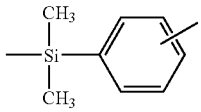

*inclusive of o, m and p-positions, R is hydrogen, methyl, phenyl or allyl, letter p is independently equal to 0 or 1, l is an integer of 2 to 6, and m and n are independently integers of 0 to 200.*

*26. The conductive fluoro-resin composition of claim 22, wherein the reactive fluorinated polyether compound has a number average molecular weight of about 400 to about 100,000.*

*27. The conductive fluoro-resin composition of claim 22, wherein the compound having at least two hydrogen atoms each directly attached to a silicon atom, (B), is a low molecular weight organohydrogenpolysiloxane or cyclic organohydrogenpolycyclosiloxane having 2 to 10 silicon atoms.*

*28. The conductive fluoro-resin composition of claim 22, wherein the compound having at least two hydrogen atoms each directly attached to a silicon atom, (B), is a perfluoropolyether or perfluoropolyalkylene compound having SiH radicals at the ends of the backbones thereof.*

*29. The conductive fluoro-resin composition of claim 22, wherein the atomized silver particles have a mean particles size of 0.1 to 10 μm.*

*30. The conductive fluoro-resin composition of claim 22, wherein the atomized silver particles are prepared by heating silver at or above 1000° C. and atomizing the resulting silver melt into water or an inert gas to form the atomized silver particles.*

* * * * *